US010607749B2

(12) United States Patent
Aida et al.

(10) Patent No.: US 10,607,749 B2
(45) Date of Patent: Mar. 31, 2020

(54) COPOLYMER, METHOD FOR ITS PRODUCTION, WIRE COATING RESIN MATERIAL AND ELECTRIC WIRE

(71) Applicant: AGC Inc., Chiyoda-ku (JP)

(72) Inventors: Shigeru Aida, Chiyoda-ku (JP); Yoji Nakajima, Chiyoda-ku (JP); Toshifumi Kakiuchi, Chiyoda-ku (JP); Masakazu Ataku, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/803,902

(22) Filed: Nov. 6, 2017

(65) Prior Publication Data

US 2018/0061522 A1 Mar. 1, 2018

Related U.S. Application Data (63) Continuation of application No. PCT/JP2016/071595, filed on Jul. 22, 2016.

(30) Foreign Application Priority Data

Jul. 28, 2015 (JP) .................................. 2015-148487

(51) Int. Cl.
*C08F 14/26* (2006.01)
*H01B 3/44* (2006.01)
(Continued)

(52) U.S. Cl.
CPC ............. *H01B 3/445* (2013.01); *C08F 14/26* (2013.01); *C08F 210/02* (2013.01);
(Continued)

(58) Field of Classification Search
CPC .... C08F 214/265; C08F 14/26; C08F 210/02; C09D 127/18; H01B 3/445
See application file for complete search history.

(56) References Cited

U.S. PATENT DOCUMENTS

| 2009/0301752 A1 | 12/2009 | Aida et al. |
| 2014/0135438 A1 | 5/2014 | Umino et al. |
| 2016/0064115 A1 | 3/2016 | Terada et al. |

FOREIGN PATENT DOCUMENTS

| EP | 2 423 237 A1 | 2/2012 |
| JP | 3-20405 B2 | 3/1991 |

(Continued)

OTHER PUBLICATIONS

International Search Report dated Aug. 16, 2016 in PCT/JP2016/071595, filed on Jul. 22, 2016.

(Continued)

*Primary Examiner* — Mark S Kaucher
(74) *Attorney, Agent, or Firm* — Oblon, McClelland, Maier & Neustadt, L.L.P.

(57) ABSTRACT

To provide an ETFE copolymer and a wire coating resin material capable of forming a coating layer which is excellent in stress cracking resistance under a high temperature and which has a high heat resistance temperature, and an electric wire having a coating layer which is excellent in stress cracking resistance under a high temperature and which has a high heat resistance temperature. A copolymer comprising structural units derived from ethylene, structural units derived from tetrafluoroethylene, and structural units derived from a third monomer, wherein in an elution curve obtained by a temperature rising elution fractionation method with respect to the copolymer, a ratio (L/H) of a proportion (L: area %) of components with elution temperatures of from 190 to 200° C. to a proportion (H: area %) of components with elution temperatures of at least 205° C., and a proportion (M: mol %) of structural units derived from the third monomer based on all structural units of the copolymer, satisfy a relation of log (L/H)/M≥0.90.

15 Claims, 1 Drawing Sheet

Concentration (mass%) of the third monomer in the solution initially charged to the polymerization vessel (51) Int. Cl.
  *C08F 214/26* (2006.01)
  *C08F 210/02* (2006.01)
  *C09D 127/18* (2006.01)
  *C08F 2/06* (2006.01)
  *C08F 4/34* (2006.01)

(52) U.S. Cl.
  CPC ........ *C08F 214/265* (2013.01); *C09D 127/18* (2013.01); *C08F 2/06* (2013.01); *C08F 4/34* (2013.01)

(56) References Cited

FOREIGN PATENT DOCUMENTS

| | | |
|---|---|---|
| JP | 7-18002 A | 1/1995 |
| JP | 7-33806 A | 2/1995 |
| JP | 2006-66329 | 3/2006 |
| JP | 5663839 | 2/2015 |
| WO | WO 98/10000 A1 | 3/1998 |
| WO | WO 2008/069278 A1 | 6/2008 |
| WO | WO 2013/015202 A1 | 1/2013 |
| WO | WO 2014/189016 A1 | 11/2014 |

OTHER PUBLICATIONS

Third Party Statement (Information Statement) dated Aug. 24, 2018 in Japanese Patent Application No. 2017-530841 (with English translation), citing documents AO through AR, AX and AY therein, 29 pages.

Arai, K., "Studies on structural chemistry regarding the elastic modulus and the phase transition temperature of an ethylene-tetrafluoroethylene copolymer". Doctoral dissertation, Tokyo Institute of Technology, Sep. 2011, [searched on Jul. 31, 2018], Retrieved from the Internet: URL: http://t2r2.star.titech.ac.jp/rrws/file/CTT100725588/ATD100000413/.

Yamabe, M., et al., "Copolymerization of Tetrafluoroethylene and Ethylene in Chlorofluorocarbon Solvents", Asahi Glass research report, 1980, vol. 30, first issue, pp. 51-58 (reference document 17 mentioned in Publication 4 at pp. 27 and 53).

COPOLYMER, METHOD FOR ITS PRODUCTION, WIRE COATING RESIN MATERIAL AND ELECTRIC WIRE

TECHNICAL FIELD

The present invention relates to a copolymer, a method for its production, a wire coating resin material and an electric wire.

BACKGROUND ART

A copolymer (hereinafter referred to also as an ETFE copolymer) having structural units derived from ethylene and structural units derived from tetrafluoroethylene, is excellent in heat resistance, chemical resistance, weather resistance, electrical insulation properties, mechanical properties, etc. and thus is used as a material for a coating layer of an electric wire in aircrafts, automobiles, industrial robots, etc.

However, an electric wire having a coating layer formed of an ETFE copolymer has such a problem that if the electric wire is held at a high temperature in a state of being bent, cracking is likely to occur in the coating layer. Recently, along with high performance of aircrafts, automobiles, etc., a coating layer of an electric wire is desired to have its nature against cracking (hereinafter referred to also as stress cracking resistance at a high temperature) improved so that even if the electric wire is held at a high temperature in a state of being bent, cracking is less likely to occur in the coating layer.

The following one has been proposed as an ETFE copolymer capable of improving stress cracking resistance of the coating layer at a high temperature.

An ETFE copolymer wherein the content of chlorine atoms is at most 70 ppm, the ratio (molar ratio) of structural units derived from tetrafluoroethylene/structural units derived from ethylene is from 40/60 to 70/30, structural units derived from other monomer(s) are contained in an amount of from 0.3 to 8 mol % based on all structural units, and the volume flow rate is from 0.01 to 1,000 mm$^3$/sec. (Patent Document 1).

PRIOR ART DOCUMENT

Patent Document

Patent Document 1: Japanese Patent No. 5663839

DISCLOSURE OF INVENTION

Technical Problem

However, even in the case of the ETFE copolymer in Patent Document 1, the stress cracking resistance of the coating layer at a high temperature is insufficient. As the environment of usage of an electric wire in aircrafts, automobiles, etc. becomes severer, the electric wire is required to have higher reliability. Therefore, for the coating layer of the electric wire, further improvement in the stress cracking resistance at a high temperatures, and a high heat resistance temperature (a high melting point of the ETFE copolymer) are desired.

It is an object of the present invention to provide an ETFE copolymer and a wire coating resin material, capable of forming a coating layer which is excellent in stress cracking resistance at a high temperature and which has a high heat resistance temperature, and an electric wire having a coating layer which is excellent in stress cracking resistance at a high temperature and which has a high heat resistance temperature.

Solution to Problem

The present inventors have conducted an extensive study for improvement in stress cracking resistance at a high temperature of the coating layer made of an ETFE copolymer, and as a result, have found it possible to improve stress cracking resistance at a high temperature of the coating layer made of an ETFE copolymer by reducing the proportion of highly crystalline components and increasing the proportion of low crystalline components in the ETFE copolymer.

In order to increase the proportion of low crystalline components in an ETFE copolymer, it is conceivable to increase the proportion of structural units derived from a third monomer in the ETFE copolymer. However, if the proportion of structural units derived from a third monomer in an ETFE copolymer is increased, the melting point of the ETFE copolymer will be lowered, whereby the heat resistance temperature of the coating layer of the electric wire becomes insufficient.

Therefore, by increasing the proportion of low crystalline components, while suppressing the proportion of structural units derived from a third monomer, and by reducing the proportion of highly crystalline components in the ETFE copolymer, the present inventors have accomplished the present invention in which both stress cracking resistance at a high temperature and a high heat resistance temperature are satisfied.

The present invention has embodiments of the following [1] to [15].

[1] A copolymer comprising structural units derived from ethylene, structural units derived from tetrafluoroethylene and structural units derived from a third monomer, wherein in an elution curve obtained by a temperature rising elution fractionation method with respect to the copolymer, a ratio (L/H) of a proportion (L: area %) of components with elution temperatures of from 190 to 200° C. to a proportion (H: area %) of components with elution temperatures of at least 205° C., and a proportion (M: mol %) of structural units derived from the third monomer based on all structural units of the copolymer, satisfy a relation of the following formula (I), $$\log(L/H)/M \geq 0.90 \qquad \text{(I)}$$

[2] The copolymer according to [1], wherein the proportion of structural units derived from tetrafluoroethylene based the total of structural units derived from ethylene and structural units derived from tetrafluoroethylene, is from 40 to 70 mol %.

[3] The copolymer according to [1] or [2], wherein the proportion of structural units derived from the third monomer based on all structural units of the copolymer, is from 0.1 to 5 mol %.

[4] The copolymer according to any one of [1] to [3], wherein the third monomer is a fluoroalkyl ethylene or a perfluoro(alkyl vinyl ether).

[5] The copolymer according to any one of [1] to [4], of which the melting point is from 230 to 280° C.

[6] The copolymer according to any one of [1] to [5], of which the melt flow rate as measured in accordance with ASTM D3159 under conditions of a temperature of 297° C. and a load of 49N, is from 1 to 50 g/10 min.

[7] A wire coating resin material comprising the copolymer as defined in any one of [1] to [6].

[8] An electric wire comprising a core wire and a coating layer made of the wire coating resin material as defined in [7], coated on the core wire.

[9] The electric wire according to [8], wherein the thickness of the coating layer is from 0.01 to 5 mm.

[10] The electric wire according to [8] or [9], wherein the cross-sectional area of the core wire is from 0.01 to 200 mm$^2$.

[11] A method for producing a copolymer comprising structural units derived from ethylene, structural units derived from tetrafluoroethylene and structural units derived from a third monomer, wherein after initiating polymerization by charging ethylene, tetrafluoroethylene and the third monomer into a polymerization vessel, at the time of additionally supplying ethylene, tetrafluoroethylene and the third monomer continuously or intermittently into the polymerization vessel, the proportion (m2: mol %) of the third monomer to be additionally supplied based on the total of ethylene and tetrafluoroethylene to be additionally supplied, is differentiated from the proportion (M1: mol %) of structural units derived from the third monomer based on all structural units of the copolymer to be formed in the initial stage of polymerization, so that m2/M1 would be at least 1.10.

[12] The method for producing a copolymer according to [11], wherein a compound having a chlorine-carbon bond is not permitted to substantially exist in the polymerization vessel.

[13] The method for producing a copolymer according to [11] or [12], wherein the proportion of structural units derived from tetrafluoroethylene based on the total of structural units derived from ethylene and structural units derived from tetrafluoroethylene in the obtained copolymer, is from 40 to 70 mol %.

[14] The method for producing a copolymer according to any one of [11] to [13], wherein the proportion of structural units derived from the third monomer based on all structural units of the copolymer, is from 0.1 to 5 mol %.

[15] The method for producing a copolymer according to any one of [11] to [14], wherein the third monomer is a fluoroalkyl ethylene or a perfluoro(alkyl vinyl ether).

Advantageous Effects of Invention

The copolymer and the wire coating resin material of the present invention are capable of forming a coating layer which is excellent in stress cracking resistance at a high temperature and which has a high heat resistance temperature.

According to the method for producing a copolymer of the present invention, it is possible to produce a copolymer capable of forming a coating layer which is excellent in stress cracking resistance at a high temperature and which has a high heat resistance temperature.

The electric wire of the present invention has a coating layer which is excellent in stress cracking resistance at a high temperature and which has a high heat resistance temperature.

DESCRIPTION OF EMBODIMENTS

In the present specification, meanings of the following terms are as follows.

A "temperature rising elution fractionation method" is a method of injecting a sample solution into a column packed with a filler to let the sample be crystallized on the surface of the filler, then elevating the temperature of the column while letting the mobile phase flow in the column, to let the sample be eluted in the mobile phase, and detecting the concentration of the sample eluted in the mobile phase, to obtain the relation between the elution temperature and the elution amount. Hereinafter, the "temperature rising elution fractionation method" is referred to also as "TREF".

A "melting point" is a temperature at the endothermic peak due to melting as measured by a differential scanning calorimetry.

A "melt flow rate" is the mass of a polymer flowing out for 10 minutes from an orifice with a diameter of 2 mm and a length of 8 mm, as measured in accordance with ASTM D3159 under conditions of a temperature of 297° C. and a load of 49N. Hereinafter, the "melt flow rate" is referred to also as "MFR".

In the following, "structural units" will be referred to as "units".

<Copolymer>

The copolymer of the present invention is an ETFE copolymer comprising structural units (hereinafter referred to also as E units) derived from ethylene, structural units (hereinafter referred to also as TFE units) derived from tetrafluoroethylene (hereinafter referred to also as TFE) and structural units (hereinafter referred to also as third units) derived from a third monomer.

(Units)

The proportion of E units is, based on the total of E units and TFE units, preferably from 60 to 30 mol %, more preferably from 50 to 35 mol %, further preferably from 46 to 43 mol %. The proportion of TFE units is, based on the total of E units and TFE units, preferably from 40 to 70 mol %, more preferably from 50 to 65 mol %, further preferably from 54 to 57 mol %. When the proportions of E units and TFE units are within the above ranges, mechanical properties such as heat resistance, weather resistance, chemical resistance, liquid chemical impermeability, stress cracking resistance, tensile strength, etc. of the coating layer, and melt moldability, etc. of the copolymer, will be further excellent.

If the proportion of E units is small (if the proportion of TFE units is large), the proportion of fluorinated monomer units to lower the cohesive force of polymer chains becomes large, whereby the mechanical properties of the coating layer may sometimes be decreased.

If the proportion of E units is large (if the proportion of TFE units is small), the proportion of E units being a non-fluorinated monomer becomes large, whereby decomposition of the copolymer at a high temperature will be accelerated, and the melting point of the copolymer will be lowered. Therefore, the heat resistance of the coating layer may sometimes be decreased.

As the copolymer of the present invention has third units, the mechanical properties of the coating layer and the melt-moldability of the copolymer will be improved.

The third monomer may, for example, be a fluoroalkyl ethylene (hereinafter referred to also as FAE) represented by $CH_2=CX(CF_2)_nY$ (wherein X and Y are each independently a hydrogen atom or a fluorine atom, n is an integer of from 2 to 8), a fluoroolefin (excluding TFE), a perfluoro(alkyl vinyl ether) (hereinafter referred to also as PAVE), a perfluorovinyl ether having two polymerizable carbon-carbon double bonds, or a fluorinated monomer having an aliphatic ring structure. As the third units, one type may be used alone, or two or more types may be used in combination.

FAE includes $CH_2=CF(CF_2)_nF$, $CH_2=CF(CF_2)_nH$, $CH_2=CH(CF_2)_nF$, $CH_2=CH(CF_2)_nH$ (where n is an integer of from 2 to 8), etc.

The fluoroolefin includes vinylidene fluoride, vinyl fluoride, trifluoroethylene, hexafluoroisobutylene, hexafluoropropylene, etc.

PAVE includes perfluoro(methyl vinyl ether), perfluoro (ethyl vinyl ether), perfluoro(propyl vinyl ether), perfluoro (butyl vinyl ether), etc.

The perfluorovinyl ether having two polymerizable carbon-carbon double bonds includes $CF_2=CFOCF_2CF=CF_2$, $CF_2=CFO(CF_2)_2CF=CF_2$, etc.

The fluorinated monomer having an aliphatic ring structure includes perfluoro(2,2-dimethyl-1,3-dioxole), 2,2,4-trifluoro-5-trifluoromethoxy-1,3-dioxole, perfluoro(2-methylene-4-methyl-1,3-dioxolane), etc.

As the third monomer, from such a viewpoint that a coating layer excellent in stress cracking resistance at a high temperature is easily obtainable, either one or both of FAE and PAVE are preferred, and FAE is more preferred.

As FAE, from such a viewpoint that a coating layer excellent in stress cracking resistance at a high temperature is easily obtainable, a compound represented by $CH_2=CH(CF_2)_nY$ is preferred. n is, from such a viewpoint that a coating layer significantly superior in stress cracking resistance at a high temperature is easily obtainable, an integer of from 2 to 8, preferably an integer of from 4 to 6.

As FAE, one type may be used alone, or two or more types may be used in corn bination.

The proportion of third units is, based on all units of the copolymer, preferably from 0.1 to 5 mol %, more preferably from 1.0 to 3 mol %, further preferably from 1.5 to 2.5 mol %, particularly preferably from 1.8 to 2.3 mol %. When the proportion of third units is at least the lower limit value in the above range, it is easy to obtain a coating layer excellent in stress cracking resistance at a high temperature. When the proportion of third units is at most the upper limit value in the above range, the mechanical properties of the coating layer will be excellent. Further, a decrease in the melting point of the copolymer can be suppressed, and the heat resistance temperature of the coating layer can be made high.

(Eluted Components in TREF)

In the copolymer of the present invention, a ratio (L/H) of the proportion (L: area %) of components with elution temperatures of from 190 to 200° C. to the proportion (H: area %) of components with elution temperatures of at least 205° C. in an elution curve obtained by TREF, and the proportion (M: mol %) of third units in the copolymer, satisfy a relation of the following formula (I):

$$\log(L/H)/M \geq 0.90 \quad (I)$$

The log (L/H)/M is preferably at least 1.1, more preferably at least 1.2. Further, the log (L/H)/M is preferably at most 15, more preferably at most 12.

According to a study made by the present inventors, the smaller the proportion of components with elution temperatures of at least 205° C., the better the stress cracking resistance at a high temperature of the coating layer. For example, even if an electric wire having a coating layer made of an ETFE copolymer wherein the proportion of components with elution temperatures of at least 205° C. is at most 1.0 area %, is heat-treated at a high temperature, and then, the electric wire is wound on its self diameter and again heat-treated at a high temperature in the stressed state, cracking tends to hardly occur in the coating layer.

The log (L/H) represents the ratio of low-temperature eluting components to high temperature eluting components, i.e. the ratio of low crystalline components to highly crystalline components. The larger the ratio, the smaller the amount of highly crystalline components that cause cracking in the coating layer.

The log (L/H)/M represents a ratio of the low crystalline components to the third units that lower the crystallinity of the copolymer. The larger the ratio, the higher the proportion of the low crystalline components, which increases per third units, i.e. it is possible to increase the proportion of the low crystalline components of the copolymer while suppressing the proportion of third units that lower the melting point of the copolymer, and, as a result, it is possible to improve the stress cracking resistance at a high temperature of the coating layer.

The following points may be mentioned as merits by suppressing the proportion (M) of third units to be low.

Third units are more expensive than ethylene and TFE. Therefore, the fact that the stress cracking resistance at a high temperature of the coating layer is improved while suppressing the proportion of third units to be low, means that it is possible to improve the stress cracking resistance at a high temperature of the coating layer at a low cost.

Third units will lower the melting point of the copolymer. Therefore, the fact that the stress cracking resistance at a high temperature of the coating layer can be improved while suppressing the proportion of third units to be low, means that it is possible to improve the stress cracking resistance at a high temperature of the coating layer without lowering the melting point of the copolymer.

The elution curve by TREF is obtained by the following procedure.

A sample (copolymer) is added to the same solvent as the mobile phase so that the sample concentration would be 3 mg/mL, followed by stirring at 210° C. for 30 minutes to prepare a sample solution.

200 µL of the sample solution is injected to a column packed with stainless steel beads as a filler.

The column is cooled from 195° C. to 120° C. at a rate of 4° C./min. to crystallize the sample on the surface of the filler.

The column is held at 120° C. for 5 minutes to bring it to a thermal equilibrium state.

Figure 1:
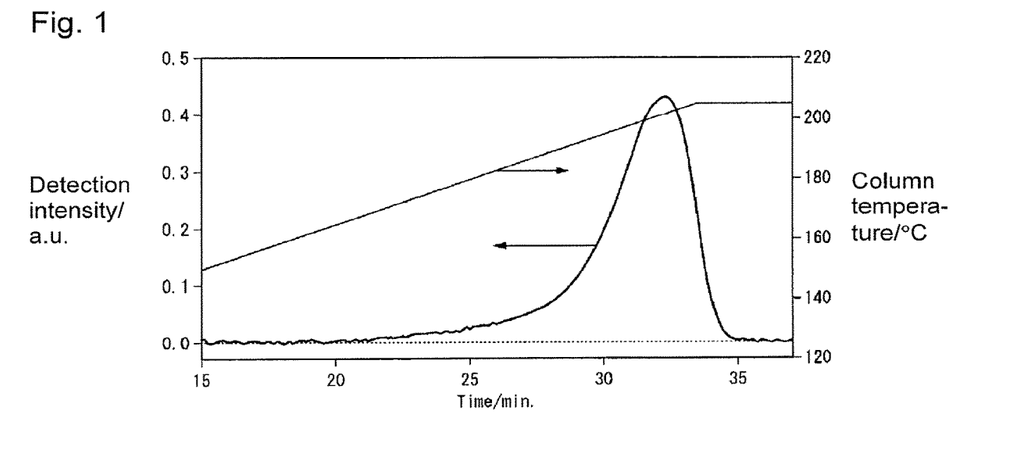
FIG. 1 is a graph showing an example of an elution curve obtained by a temperature rising elution fractionation method with respect to the copolymer of the present invention, and a temperature rising profile of the column temperature.

While letting the mobile phase flow at 1.00 mL/min., the column temperature is raised from 120° C. to 205° C. at a rate of 3° C./min. in the temperature rising profile as shown in FIG. 1 and held at 205° C. for 30 minutes, to let the sample on surface of the filler be sequentially eluted.

The mobile phase flown out from the column is passed to a detector, whereby the concentration of the sample eluted in the mobile phase is detected to obtain an elution curve showing a change in the detection intensity to the elution time as shown in FIG. 1.

The elution time in the elution curve is converted to the elution temperature to obtain the desired elution curve.

The column temperature conditions in TREF are standardized to be a cooling rate of 4° C./min., a thermal equilibrium temperature of 120° C. and a temperature raising rate of 3° C./min., but, from the following reasons, adjustment of the column temperature conditions is required depending on the choice of the solvent for the mobile phase. That is, the solvent for the mobile phase can be arbitrarily selected, but depending upon the type of the solvent, the elution temperature is likely to be deviated. In a case where the solvent to be used for TREF is arbitrarily selected, TREF of the actual sample is carried out under conditions corresponding to the solvent by adjusting the column temperature conditions at the time of elution so that the peak and the half value width of standard sample would be the predetermined temperatures. Specifically, by using, as the standard sample, Fluon (registered trademark) LM-ETFE LM730AP manufactured by Asahi Glass Company, Limited and using, as the mobile phase, one selected from the following solvents, an elution curve by TREF is obtained by the above-described procedure. The column temperature conditions are adjusted so that the standard sample would have a peak temperature of 169° C. in the elution curve, and the half value width of the peak would be 13° C. It is thereby possible to obtain the same L/H also when an optional solvent is selected, and to correct the elution temperature of the sample.

As the mobile phase, a solvent containing either one or both of the following fluorinated aromatic compound (A) and the following aliphatic compound (B) is used.

Fluorinated aromatic compound (A): a fluorinated aromatic compound having a melting point of at most 230° C. and a fluorine content of from 5 to 75 mass %.

Aliphatic compound (B): a $C_{6-10}$ aliphatic compound having a melting point of at most 230° C. and having one carbonyl group.

The fluorinated aromatic compound (A) may, for example, be a fluorinated benzonitrile, a fluorinated benzoic acid or its ester, a fluorinated aromatic hydrocarbon, a fluorinated nitrobenzene, a fluorinated phenyl alkyl alcohol, an ester of a fluorinated phenol, a fluorinated aromatic ketone, a fluorinated aromatic ether, a fluorinated aromatic carbonate, a polyfluoroalkyl ester of benzoic acid, a polyfluoroalkyl ester of phthalic acid, etc. Among them, one which satisfies the above-mentioned conditions for the melting point and the fluorine content may, for example, be pentafluorobenzonitrile, 2,4,5-trifluorobenzonitrile, 2,4,6-trifluorobenzonitrile, 2,4-difluorobenzonitrile, 2,5-difluorobenzonitrile, 2,6-difluorobenzonitrile, 3,4-difluorobenzonitrile, 3,5-bis(trifluoromethyl)benzonitrile, 2-(trifluoromethyl)benzonitrile, 3-(trifluoromethyl)benzonitrile, 4-(trifluoromethyl)benzonitrile, pentafluorobenzoic acid, ethyl pentafluorobenzoate, methyl 2,4-difluorobenzoate, methyl 3-(trifluoromethyl) benzoate, methyl 4-(trifluoromethyl) benzoate, methyl 3,5-bis(trifluoromethyl) benzoate, perfluorobiphenyl, perfluoronaphthalene, perfluorophenanthrene, hexafluorobenzene, benzotrifluoride, 1,3-bis(trifluoromethyl)benzene, pentafluoronitrobenzene, 2,4-difluoronitrobenzene, pentafluorobenzyl alcohol, 1-(pentafluorophenyl)ethanol, pentafluorophenyl acetate, pentafluorophenyl propanoate, pentafluorophenyl butanoate, pentafluorophenyl pentanoate, perfluorobenzophenone, 2,3,4,5,6-pentafluorobenzophenone, 2',3',4',5',6'-pentafluoroacetophenone, 3',5'-bis(trifluoromethyl)acetophenone, pentafluoroanisole, 3,5-bis(trifluoromethyl)anisole, decafluorodiphenyl ether, 4-bromo-2,2',3,3',4',5,5',6,6'-nonafluorodiphenyl ether, bis(pentafluorophenyl) carbonate, 2,2,2-trifluoroethyl benzoate, 1,1,1,3,3,3-hexafluoroisopropyl benzoate, 2,2,3,3-tetrafluoropropyl benzoate, 2,2,3,3,3-pentafluoropropyl benzoate, 3,3,4,4,5,5,6,6,7,7,8,8,8-tridecafluorooctyl benzoate, bis(2,2,2-trifluoroethyl) phthalate, etc.

As the fluorinated aromatic compound (A), one type may be used alone, or two or more types may be used in combination.

The aliphatic compound (B) may, for example, be a cyclic ketone, a chained ester, etc. Among them, one which satisfies the above-mentioned conditions for the melting point, the carbonyl group and the number of carbon atoms, may, for example, be 2-methyl cyclopentanone, 3-methyl cyclopentanone, 2-ethyl cyclopentanone, 3-ethyl cyclopentanone, 2,2-dimethyl cyclopentanone, 2,3-dimethyl cyclopentanone, 3,3-dimethyl cyclopentanone, 2,5-dimethyl cyclopentanone, 2,4-dimethyl cyclopentanone, 3,4-dimethyl cyclopentanone, 2-propyl cyclopentanone, 2-isopropyl cyclopentanone, 3-propyl cyclopentanone, 3-isopropyl cyclopentanone, 2,2,5-trimethyl cyclopentanone, 2-butyl cyclopentanone, 2-isobutyl cyclopentanone, 2-tert-butyl cyclopentanone, 3-butyl cyclopentanone, 3-isobutyl cyclopentanone, 3-tert-butyl cyclopentanone, 2,2,5,5-tetramethyl cyclopentanone, cyclohexanone, 2-methyl cyclohexanone, 3-methyl cyclohexanone, 4-methyl cyclopentanone, 2-ethyl cyclohexanone, 3-ethyl cyclohexanone, 4-ethyl cyclohexanone, 2,2-dimethyl cyclohexanone, 2,3-dimethyl cyclohexanone, 2,4-dimethyl cyclohexanone, 2,5-dimethyl cyclohexanone, 2,6-dimethyl cyclohexanone, 2-propyl cyclohexanone, 2-isopropyl cyclohexanone, 3-propyl cyclohexanone, 3-isopropyl cyclohexanone, 4-propyl cyclohexanone, 4-isopropyl cyclohexanone, 2,2,6-trimethyl cyclohexanone, 2,2,4-trimethyl cyclohexanone, 2,4,4-trimethyl cyclohexanone, 3,3,5-trimethyl cyclohexanone, 2,4,6-trimethyl cyclohexanone, 2-butyl cyclohexanone, 2-isobutyl cyclohexanone, 2-tert-butyl cyclohexanone, 3-butyl clohexanone, 3-isobutyl cyclohexanone, 3-tert-butyl cyclohexanone, 4-butyl cyclohexanone, 4-isobutyl cyclohexanone, 4-tert-butyl cyclohexanone, 2,2-diethyl cyclohexanone, 2,4-diethyl cyclohexanone, 2,6-diethyl cyclohexanone, 3,5-diethyl cyclohexanone, 2,2,6,6-tetramethyl cyclohexanone, cycloheptanone, 2-methyl cycloheptanone, 3-methyl cycloheptanone, 4-methyl cycloheptanone, 2-ethyl cycloheptanone, 3-ethyl cycloheptanone, 4-ethyl cycloheptanone, 2,2-dimethyl cycloheptanone, 2,7-dimethyl cycloheptanone, 2-propyl cycloheptanone, 2-isopropyl cycloheptanone, 3-propyl cycloheptanone, 3-isopropyl cycloheptanone, 4-propyl cycloheptanone, 4-isopropyl cycloheptanone, 2,2,7-trimethyl cycloheptanone, isophorone, (−)-fenchone, (+)-fenchone, isopentyl formate, butyl acetate, isobutyl acetate, pentyl acetate, isopentyl acetate, hexyl acetate, cyclohexyl acetate, octyl acetate, 2-ethylhexyl acetate, ethyl butyrate, butyl butyrate, pentyl butyrate, methyl cyclohexanecarboxylate, 2,2,2-trifluoroethyl cyclohexanecarboxylate, ethyl perfluoropentanoate, etc.

As the aliphatic compound (B), one type may be used alone, or two or more types may be used in combination.

The total content of the fluorinated aromatic compound (A) and the aliphatic compound (B) in the mobile phase, is preferably at least 50 mass %, more preferably at least 70 mass %, further preferably 100 mass %.

(Melting Point)

The melting point of the copolymer of the present invention is preferably from 230 to 280° C., more preferably from 245 to 265° C., further preferably from 250 to 260° C.

When the melting point of the copolymer is at least the lower limit value in the above range, under a high temperature condition, the copolymer is less likely to be melted or softened. Therefore, in the coating layer, the thickness is less likely to be locally or entirely fluctuated, and the insulating property is less likely to be lowered. For example, the heat resistance of electric wires for automobiles is prescribed in ISO 6722. In the thermal overload test in ISO 6722, assuming an abnormally high temperature, a test at a temperature higher by 25° C. than the short-term heat resistance test temperature is set. If the melting point of the copolymer is less than 230° C., at the time when exposed to the abnormally high temperature, the coating layer may not be able to maintain the insulating properties.

When the melting point of the copolymer is at most the upper limit value in the above range, the melt moldability will be excellent.

(MFR)

MFR of the copolymer of the present invention is preferably from 1 to 50 g/10 min., more preferably from 10 to 45 g/10 min., more preferably from 20 to 40 g/10 min., most preferably from 25 to 35 g/10 min. When MFR of the copolymer is at least the lower limit value in the above range, the melt moldability will be excellent. When MFR of the copolymer is at most the upper limit value in the above range, the mechanical properties of the coating layer will be excellent.

(Method for Producing Copolymer)

The copolymer of the present invention is produced by polymerizing ethylene, TFE and a third monomer by a known polymerization method. The polymerization method may, for example, be a suspension polymerization method, a solution polymerization method or an emulsion polymerization method, and a suspension polymerization method or a solution polymerization method is preferred, and a solution polymerization method is more preferred.

The solution polymerization method may, for example, be a method of polymerizing ethylene, tetrafluoroethylene and a third monomer in the polymerization medium in the presence of a polymerization initiator and, as the case requires, a chain transfer agent.

As the polymerization medium, a perfluorocarbon, a hydrofluorocarbon or a hydrofluoroether is preferred.

As the polymerization initiator, an azo compound, a peroxy dicarbonate, a peroxy ester, a non-fluorinated diacyl peroxide, a fluorinated diacyl peroxide, a fluorinated dialkyl peroxide, an inorganic peroxide, etc. may be mentioned.

As the chain transfer agent, from such a viewpoint that the chain transfer constant is large, and the amount required to be used is less, an alcohol, a hydrocarbon, a hydrofluorocarbon, a ketone, a mercaptan, an ester or an ether is preferred, and from such a viewpoint that the chain transfer constant is larger and the stability of a terminal group in the copolymer is high, an alcohol, a hydrocarbon or a hydrofluorocarbon is more preferred, and an alcohol or a hydrocarbon is further preferred. As the alcohol, methanol or ethanol is preferred from such a viewpoint that it is easily soluble in water and it is easily separated from the copolymer after the production. As the hydrocarbon, from such a viewpoint that the chain transfer constant is further larger, the stability of a terminal group in the copolymer is high, and the boiling point is sufficiently higher than room temperature and at most 100° C., n-pentane or cyclohexane is preferred.

The polymerization temperature is preferably from 0 to 100° C., more preferably from 20 to 90° C.

The polymerization pressure is preferably from 0.1 to 10 MPa, more preferably from 0.5 to 3 MPa.

The polymerization time is preferably from 1 to 30 hours, more preferably from 2 to 20 hours.

As the method for producing a copolymer which satisfies the relation of the above formula (I), the following methods (1) to (4) may be mentioned, and from such a viewpoint that the number of process steps is small and it is easy to produce the copolymer, the method (1) or (2) is preferred, and the method (1) is more preferred.

Method (1): a method of controlling the proportions of the respective monomers so that the obtainable copolymer satisfies the relation of the formula (I).

Method (2): a method of controlling the temperature of the polymerization site so that the obtainable copolymer satisfies the relation of the formula (I).

Method (3): a method of separating specific components from the resulting copolymer so that the copolymer satisfies the relation of the formula (I).

Method (4): a method of mixing two or more copolymers different in L/H so as to obtain a copolymer which satisfies the relation of the formula (I).

The reason as to why it is possible to produce a copolymer which satisfies the relation of the formula (I) by the method (1) or (2), is as follows.

A copolymer obtainable by polymerizing various monomers is a collection of a number of polymer chains. In every polymer chain, the proportion of the respective monomer units, the molecular weight, etc. may vary, so that the elution temperature by TREF may vary i.e. may have a distribution. The present invention is one based on a finding such that among copolymers having such distributions, one satisfying the relation of the formula (I) is excellent in heat resistance. The distribution of the elution temperature by TREF is determined by the proportion of the respective monomers at the polymerization site (i.e. around radicals being reactive species in the case of radical polymerization) or by the temperature at the polymerization site. Thus, by controlling the proportions of the respective monomers at the polymerization site or the temperature at the polymerization site, it is possible to increase the proportion (L) of low crystalline components and to reduce the proportion (H) of highly crystalline components, while suppressing the proportion (M) of third units, i.e. it is possible to produce a copolymer satisfying the relation of the above formula (I).

Now, the method (1) will be specifically described.

A specific example of the method (1) may be a method wherein after initiating polymerization by charging ethylene, TFE and a third monomer into a polymerization vessel, at the time of additionally supplying ethylene, TFE and the third monomer continuously or intermittently into the polymerization vessel, the proportion of the third monomer to be additionally supplied to the total of ethylene and TFE to be additionally supplied, is differentiated from the proportion of the third units to all units of the copolymer formed at the initial state of polymerization.

The proportion represented by mol % of the third units to all units of the copolymer formed at the initial stage of polymerization, is represented by M1 in the present invention, and the proportion represented by mol % of the third monomer to be additionally supplied to the total of ethylene and TFE to be additional supplied, is represented by m2 in the present invention.

In the method (1), the ratio (m2/M1) of m2 to M1 is at least 1.10, preferably at least 1.13, more preferably at least 1.16. When m2/M1 is within the above range, it is possible to easily produce a copolymer which satisfies the relation of the formula (I).

Here, the copolymer to be produced at the initial stage of polymerization is a copolymer to be produced when the mass contained per 1 L of the polymerization medium is within a range of from 1 to 20 g.

The reason as to why it is possible to produce a copolymer which satisfies the relation of the formula (I) by controlling the ratio of m2 to M1 in the method (1), is as follows.

In the case of polymerizing the respective monomers in a polymerization medium, at the initial stage of polymerization where the mass of the copolymer contained per 1 L of the polymerization medium, is in a range of from 1 to 20 g, the viscosity of the slurry is low, whereby dissolution of the TFE/ethylene mixture gas in the liquid phase will not be suppressed. Therefore, the proportion of the third monomer present in the liquid phase will not be increased, and a copolymer will be obtained wherein the proportion (M1) of the third units is as designed.

However, if the respective monomers are polymerized in a polymerization medium, along with the progress of polymerization, a copolymer will be formed in the polymerization medium, whereby the viscosity of the slurry being a mixture of the polymerization medium and the copolymer will be raised, and along with the increase in the viscosity of the slurry, dissolution into the liquid phase of the TFE/ethylene mixture gas will be suppressed. And, from the middle towards the final stage of polymerization, dissolution into the liquid phase of the TFE/ethylene mixture gas is suppressed, and at the same time, m2/M1 will be at least 1.10, i.e. the third monomer is additionally supplied in such a state that the proportion of the third monomer is relatively increased. Therefore, from the middle towards the final stage of polymerization, the proportion of the third monomer present in the liquid phase will increase, whereby it is considered that as compared with the initial stage of polymerization, a copolymer (low crystalline components) wherein the proportion of the third units is large as compared with at the initial stage of polymerization, will be formed in a large amount. Such a mechanism is based on controlling m2/M1, and even when m2 and M1 are suppressed to be low, respectively, if m2/M1 is controlled in order to reduce the proportion (M) of the third units in the copolymer finally obtainable, a similar mechanism will be exhibited, and low crystalline components will be formed in a large amount.

Thus, by controlling the ratio (m2/M1) of m2 to M1, it becomes possible to increase the proportion (L) of low crystalline components and to reduce the proportion (H) of highly crystalline components, while controlling the proportion (M) of the third units to be low, i.e. it becomes possible to obtain a copolymer which satisfies the relation of the formula (I).

For example, as shown in Examples given hereinafter, by initiating polymerization by charging the respective monomers, the polymerization medium, etc. in such charging proportions that the proportion (M1) of the third units in the copolymer formed at the initial stage of polymerization would be 1.5 mol %, adjusting the proportion (m2) of the third monomer to the total of ethylene and TFE additionally supplied continuously or intermittently during polymerization to be 1.75 mol %, and adjusting the proportion (M) of the third units in the finally obtainable copolymer to be 2.0 mol %, it is possible to produce a copolymer which satisfies the relation of the formula (I).

In the method for production of a copolymer of the present invention, it is preferred not to let a compound having a chlorine-carbon bond substantially be present in the polymerization vessel (polymerization site). If a compound having a chlorine-carbon bond is present, heat aging resistance or thermal stress cracking resistance will decrease.

Not to let a compound having a chlorine-carbon bond substantially be present, means that a compound having a chlorine-carbon bond may not positively be permitted to be present e.g. by an operation of adding a compound having a chlorine-carbon bond to the polymerization vessel. That is, it means that there is no compound having a chlorine-carbon bond at all in the polymerization vessel, or a compound metal element having a chlorine-carbon bond may be present as an unavoidable impurity in the polymerization vessel. Not to let a compound having a chlorine-carbon bond substantially be present, specifically means such a state that a compound having a chlorine-carbon bond in the solution in the polymerization vessel is at most 3,000 ppm.

The compound having a chlorine-carbon bond may, for example, be a hydrochlorocarbon such as methyl chloride, methylene chloride, chloroform or dichloroethane, a hydrochlorofluorocarbon such as chlorofluoromethylene, 1,1-dichloro-2,2,3,3,3-pentafluoropropane or 1,3-dichloro-1,1,2,2,3-pentafluoropropane (AK225), etc.

(Advantageous Effects)

In the copolymer of the present invention as described above, in order to satisfy the relation of the formula (I), the proportion of highly crystalline components that cause cracking in the coating layer, is small. Further, since the relation of the formula (I) is satisfied, i.e. since the proportion of low crystalline components per proportion of the third units, is large, it is possible to increase the proportion of low crystalline components (i.e. to reduce the proportion of highly crystalline components), while suppressing the proportion of the third units that lower the melting point of the copolymer. As a result, it is possible to form a coating layer which is excellent in stress cracking resistance at a high temperature and which has a high heat resistance temperature.

<Wire Coating Resin Material>

The wire coating resin material of the present invention comprises the copolymer of the present invention.

The content of the copolymer of the present invention in the wire coating resin material, is preferably at least 50 mass %, more preferably at least 80 mass %, further preferably at least 95 mass %, based on the wire coating resin material.

The wire coating resin material of the present invention may contain other components to the extent not to impair the effects of the present invention. As other components, other resins, additives, etc. may be mentioned.

Such other resins may, for example, be an ETFE copolymer other than the copolymer of the present invention, a melt-moldable fluororesin other than an ETFE copolymer, etc.

Such additives may, for example, be a thermal stabilizer, a pigment, an ultraviolet absorber, a filler, a crosslinking agent, a crosslinking aid, an organic peroxide, etc.

The wire coating resin material of the present invention preferably contains a heat stabilizer.

As the heat stabilizer, cuprous oxide, cupric oxide, cuprous iodide or cupric iodide is preferred. As the heat stabilizer, cupric oxide is more preferred from the viewpoint of excellent stability even in the air with high humidity.

The content of the heat stabilizer is preferably from 0.00015 to 0.02 part by mass, more preferably from 0.0002 to 0.005 part by mass, particularly preferably from 0.0003 to 0.002 part by mass, per 100 parts by mass of the copolymer of the present invention. When the content of the heat stabilizer is within the above range, the coating layer made of the wire coating resin material will be further excellent in stress cracking resistance at a high temperature, and coloration will be suppressed.

(Advantageous Effects)

The wire coating resin material of the present invention as described above, contains the copolymer of the present invention, whereby it is possible to form a coating layer which is excellent in stress cracking resistance at a high temperature and which has a high heat resistance temperature.

<Electric Wire>

The electric wire of the present invention comprises a core wire and a coating layer made of the wire coating resin material of the present invention coated on the core wire.

(Core Wire)

As the material for the core wire, copper, a copper alloy, aluminum, an aluminum alloy, etc. may be mentioned, and copper is preferred. The core wire may have plating of tin, silver or the like applied.

The cross-sectional area of the core wire is preferably from 0.01 to 200 mm$^2$, more preferably from 0.05 to 100 mm$^2$, further preferably from 0.1 to 50 mm$^2$. When the cross-sectional area of the core wire is at least the lower limit value in the above range, it is possible to transmit a signal or electric power of sufficient capacity, such being preferred. When the cross-sectional area of the core wire is at most the upper limit value in the above range, flexibility is excellent, such being preferred.

(Coating Layer)

The thickness of the coating layer is preferably from 0.01 to 5 mm, more preferably from 0.05 to 1 mm, further preferably from 0.1 to 0.5 mm. When the thickness of the coating layer is at least the lower limit value in the above range, electrical insulation will be sufficient. When the thickness of the coating layer is at most the upper limit value in the above range, the amount of the wire coating resin material to be used, will be suppressed, whereby the cost for the electric wire can be suppressed. Further, the electric wire will not become heavy, and it will be suitable as an aircraft wire or an automotive wire, of which weight reduction is desired.

(Method for Producing Electric Wire)

The electric wire of the present invention can be produced, for example, by melting the wire coating resin material and extruding it around the core wire from a discharge port of a die, to form a coating layer around the core wire.

The apparatus to be used for the production of the electric wire may, for example, be an extruder provided with a wire die crosshead, etc.

(Advantageous Effects)

In the electric wire of the present invention as described above, the coating layer is made of the wire coating resin material of the present invention, whereby the coating layer is excellent in stress cracking resistance at a high temperature and has a high heat resistance temperature. Such an electric wire is less susceptible to dielectric breakdown due to cracking even when used for an aircraft or automobile to be exposed to a high temperature.

Further, since the copolymer of the present invention contained in the wire coating resin material of the present invention is excellent in heat resistance and melt-moldability, even an electric wire of which the cross-sectional area of the core wire is small and the thickness of the coating layer is thin, can be produced at a high speed, and it is possible to produce an electric wire excellent in heat resistance at low cost.

EXAMPLES

Now, the present invention will be described in further detail with reference to Examples, but the present invention is not limited to these Examples.

Ex. 1 to 3 are Examples of the present invention, and Ex. 4 and 5 are Comparative Examples.

(MFR)

By using a melt indexer (manufactured by Techno Seven Co., Ltd.), in accordance with ASTM D3159, the mass (g) of the copolymer flowing out from an orifice with a diameter of 2 mm and a length of 8 mm under conditions of a temperature of 297° C. and a load of 49N in 10 minutes, was measured and adopted as MFR (g/10 min.).

(Melting Point)

By using a scanning differential thermal analyzer (DSC7200, manufactured by SII), 5 mg of the copolymer was heated to 300° C. at a rate of 10° C./min. and held for 5 minutes in an air atmosphere, then cooled to 150° C. at a rate of 10° C./min. and held for 5 minutes, and again heated to 300° C. at a rate of 10° C./min., whereby the temperature at the endothermic peak due to melting was adopted as the melting point (° C.).

(Chlorine Content)

The copolymer was subjected to combustion treatment by an oxygen flask method, whereby the generated decomposition gas was absorbed in an absorbing liquid, and chloride ions were quantified by an ion chromatography method, as the chlorine content (mass ppm).

(Proportions of the Respective Units)

They were calculated from the results of the total fluorine amount measurement, and from the results of the melt F-NMR measurement.

(TREF)

As the mobile phase, isophorone was selected from the above-described fluorinated aromatic compound (A) and aliphatic compound (B).

Correction of the sample elution temperature was carried out as follows.

Using, as the standard sample, Fluon (registered trademark) LM-ETFE LM730AP manufactured by Asahi Glass Company, Limited and, as the mobile phase, the solvent selected as mentioned above, an elution curve by TREF was obtained by the procedure as described below. The thermal equilibrium temperature and the column temperature raising and lowering rates were adjusted so that the standard sample would have a peak temperature of 169° C. in the elution curve, and the half-value width of the peak would be 13° C., thereby to correct the sample elution temperature.

With respect to the copolymer, the elution curve by TREF was obtained by the following procedure.

A sample (copolymer) was added to the same solvent as the mobile phase so that the sample concentration would be 3 mg/mL and stirred at 210° C. for 30 minutes by using an autosampler to prepare a sample solution.

200 μL of the sample solution was injected into a column having stainless steel beads packed as a filler.

The column was cooled from 195° C. to 120° C. at a rate of 4° C./min. to let the sample be crystallized on the surface of the filler.

The column was held at 120° C. for 5 minutes to bring it to a thermal equilibrium state.

While letting the mobile phase flow in the column at a rate of 1.00 mL/min., the column was heated from 120° C. to 205° C. at a rate of 3° C./min. to let the sample on the surface of the filler be eluted sequentially.

The mobile phase flowing out of the column was passed to a viscosity detector, whereby the concentration of the sample eluted in the mobile phase was detected.

(Stress Cracking Resistance)

0.0006 Part by mass of cupric oxide as a thermal stabilizer was added to 100 parts by mass of the copolymer, and by using an extruder, a pellet-shaped wire coating resin material was obtained, and around a core wire with a diameter of 1.8 mm, the wire coating resin material was extruded by a melt extrusion method to form a coating layer with a thickness of 0.5 mm to obtain an electric wire.

The obtained electric wire was placed in an oven of 200° C. and subjected to heat treatment for 96 hours, and then cooled to room temperature. The heat-treated electric wire was cut into five pieces, then fixed in a state wound at least 8 times around the electric wire itself, placed in an oven of 200° C. and heat-treated for 1 hour, whereupon the presence or absence of cracking in the coating layer was confirmed.

(Ex. 1)

A jacketed stainless steel polymerization vessel with an internal volume of 430 L was evacuated. Into the polymerization vessel, 255 L of a $CF_3(CF_2)_5H$ solution containing 0.58 mass % of $CH_2=CH(CF_2)_4F$ (hereinafter referred to also as PFBE) and 0.6 mass % of methanol, was charged and heated to 66° C. while stirring the inside of the polymerization vessel. Into the polymerization vessel, a mixed gas of TFE/ethylene=84/16 (molar ratio) was charged until the internal pressure became 1.5 MPa (gauge pressure), and 3.6 kg of a $CF_3(CF_2)_5H$ solution containing 1 mass % of tert-butyl peroxypivalate was added thereto to initiate polymerization. During the polymerization, a mixed gas of TFE/ethylene=54/46 (molar ratio) was continuously additionally supplied so that the internal pressure was maintained to be 1.5 MPaG, and at the same time, PFBE was continuously additionally supplied. The proportion (m2) of PFBE additionally supplied to the total of ethylene and TFE was 1.75 mol %. The proportion (M1) of PFBE units to all units in the copolymer at the stage (initial stage of polymerization) when the mixed gas of TFE/E=54/46 (molar ratio) was charged in an amount of 3 kg, was 1.5 mol %. The supply of gas was stopped at the point when the mixed gas of TFE/ethylene=54/46 (molar ratio) was charged in an amount of 34 kg, and the polymerization vessel was cooled and an unreacted mixed gas was purged to obtain a slurry of a copolymer. The obtained slurry was transferred to a granulating vessel of 850 L, 340 L of water was added, and the solvent was removed under heating to obtain a copolymer (1). The results are shown in Table 1.

(Ex. 2)

A copolymer (2) was obtained in the same manner as in Ex. 1 except that the concentration of PFBE in the solution charged to the polymerization vessel was changed from 0.58 mass % to 0.56 mass %, the amount of the polymerization initiator solution was changed from 3.6 kg to 3.2 kg, and the proportion (m2) of PFBE additionally supplied to the total of ethylene and TFE additionally supplied, was changed from 1.75 mol % to 1.7 mol %. The results are shown in Table 1.

(Ex. 3)

A copolymer (3) was obtained in the same manner as in Ex. 1 except that the concentration of PFBE in the solution charged to the polymerization vessel was changed from 0.58 mass % to 0.33 mass %, the concentration of methanol in the solution charged to the polymerization vessel was changed from 0.6 mass % to 0.65 mass %, the amount of the polymerization initiator solution was changed from 3.6 kg to 2.7 kg, and the proportion (m2) of PFBE additionally supplied to the total of ethylene and TFE additionally supplied, was changed from 1.75 mol % to 1.45 mol %. The proportion (M1) of PFBE units to all units of the copolymer at the stage (initial stage of polymerization) when the mixed gas of TFE/ethylene=54/46 (molar ratio) was charged in an amount of 3 kg, was 1.0 mol %. The results are shown in Table 1.

(Ex. 4)

A copolymer (4) was obtained in the same manner as in Ex. 1 except that the concentration of PFBE in the solution charged to the polymerization vessel was changed from 0.58 mass % to 0.75 mass %, the concentration of methanol in the solution charged to the polymerization vessel was changed from 0.6 mass % to 0.7 mass %, the amount of the polymerization initiator solution was changed from 3.6 kg to 1.8 kg, and the proportion (m2) of PFBE additionally supplied to the total of ethylene and TFE additionally supplied was changed from 1.75 mol % to 2.0 mol %. The proportion (M1) of PFBE units to all units of the copolymer at the stage (initial stage of polymerization) when the mixed gas of TFE/ethylene=54/46 (molar ratio) was charged in an amount of 3 kg, was 2.0 mol %. The results are shown in Table 1.

(Ex. 5)

A copolymer (5) was obtained in the same manner as in Ex. 1 except that the concentration of PFBE in the solution charged to the polymerization vessel was changed from 0.58 mass % to 0.50 mass %, the concentration of methanol in the solution charged to the polymerization vessel was changed from 0.6 mass % to 0.85 mass %, the amount of the polymerization initiator solution was changed from 3.6 kg to 1.3 kg, and the proportion (m2) of PFBE additionally supplied to the total of ethylene and TFE additionally supplied, was changed from 1.75 mol % to 1.4 mol %. The proportion (M1) of PFBE units to all units of the copolymer at the stage (initial stage of polymerization) when the mixed gas of TFE/ethylene=54/46 (molar ratio) was charged in an amount of 3 kg, was 1.4 mol %. The results are shown in Table 1.

TABLE 1

| | Initial charge Concentration of PFBE [mass %] | Initial stage of polymerization (M1) [mol %] | Additional supply (m2) [mol %] | m2/M1 | MFR [g/10 min.] | Melting point [° C.] | Chlorine content [mass ppm] |
|---|---|---|---|---|---|---|---|
| Ex. 1 | 0.58 | 1.5 | 1.75 | 1.17 | 33 | 255 | 50 |
| Ex. 2 | 0.56 | 1.5 | 1.7 | 1.13 | 27 | 257 | 50 |
| Ex. 3 | 0.33 | 1.0 | 1.45 | 1.45 | 28 | 261 | 50 |
| Ex. 4 | 0.75 | 2.0 | 2.0 | 1.00 | 35 | 255 | 50 |
| Ex. 5 | 0.50 | 1.4 | 1.4 | 1.00 | 38 | 257 | 50 |

TABLE 1-continued

|  | Proportions of respective units [mol %] | | | Eluted components by TREF [area %] | | | Number of cracked samples |
|---|---|---|---|---|---|---|---|
|  | TFE | Ethylene | PFBE (M) | (L) | (H) | log (L/H)/M |  |
| Ex. 1 | 53.9 | 44.1 | 2.0 | 64.6 | 0.2 | 1.23 | 0 |
| Ex. 2 | 53.7 | 44.5 | 1.8 | 62.4 | 0.4 | 1.23 | 0 |
| Ex. 3 | 54.2 | 44.2 | 1.6 | 44.7 | 1.4 | 0.95 | 2 |
| Ex. 4 | 53.9 | 44.1 | 2.0 | 61.7 | 0.9 | 0.89 | 5 |
| Ex. 5 | 54.1 | 44.3 | 1.6 | 43.5 | 7.0 | 0.50 | 5 |

In Ex. 1 to 3, the proportion (m2) of PFBE additionally supplied to the total of ethylene and TFE additionally supplied, was differentiated from the proportion (M1) of PFBE units to all units of the copolymer formed at the initial stage of polymerization, whereby copolymers wherein the log (L/H)/M was at least 0.90, were obtained.

On the other hand, in Ex. 4 and 5, m2 was made to be the same level as M1, whereby copolymers wherein the log (L/H)/M was less than 0.90, were obtained.

Figure 2:
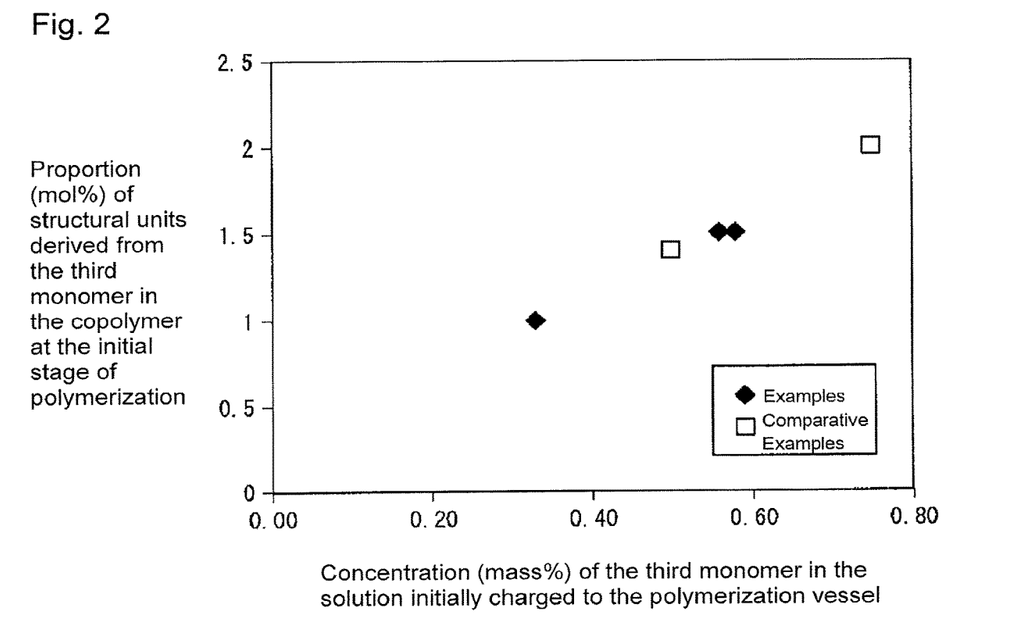
FIG. 2 is a graph showing the relation between the concentration of the third monomer in the solution initially charged to the polymerization vessel and the proportion of structural units derived from the third monomer in the copolymer formed in the initial stage of polymerization in Ex. 1 to 5.

FIG. 2 is a graph showing the relation between the concentration of the third monomer (PFBE) in the solution initially charged to the polymerization vessel and the proportion (M1) of the third monomer (PFBE) units of the copolymer formed at the initial stage of polymerization, in Ex. 1 to 5. As shown in the graph, M1 at the stage (initial stage of polymerization) when the mixed gas of TFE/ethylene=54/46 (molar ratio) was charged in an amount of 3 kg, depends on the concentration of PFBE in the solution initially charged to the polymerization vessel.

Subsequently, in Ex. 1 to 3, m2 and M1 were differentiated at the time of additionally continuously supplying the respective monomers, whereby it is considered that from the middle toward the final stage of polymerization, the proportion of the third monomer present in the liquid phase increased, and a copolymer (low-crystalline component) wherein the proportion of the third units was large as compared with at the initial stage of polymerization, was formed in a large amount. On the other hand, in Ex. 4 and 5, m2 and M1 were made to be substantially the same at the time of additionally continuously supplying the respective monomers, whereby it is considered that from the middle toward the final stage of polymerization, the proportion of the third monomer did not increase so much, and a copolymer wherein the proportion of the third units was at the same level as at the initial stage of polymerization, was formed.

In Ex. 1 and 2, in the stress cracking resistance tests, no cracking was observed, and in Ex. 3, among the five samples, cracking was observed in two samples, and no cracking was observed in the remaining three samples. On the other hand, cracking was observed in all samples in Ex. 4 and 5. This difference is a difference caused by whether m2 and M1 were differentiated or made to be substantially the same level at the time of additionally continuously supplying the respective monomers in the production of the copolymer.

INDUSTRIAL APPLICABILITY

The copolymer of the present invention is useful for a coating layer in an aircraft electric wire, an automotive electric wire, a railway electric wire, an electric wire for semiconductor manufacturing apparatus, a furnace electric wire, a pump electric wire, a chemical equipment electric wire, a heater electric wire, etc.

This application is a continuation of PCT Application No. PCT/JP2016/071595, filed on Jul. 22, 2016, which is based upon and claims the benefit of priority from Japanese Patent Application No. 2015-148487 filed on Jul. 28, 2015. The contents of those applications are incorporated herein by reference in their entireties.

What is claimed is:

1. A copolymer, comprising
structural units derived from ethylene,
structural units derived from tetrafluoroethylene, and
structural units derived from a third monomer,
wherein in an elution curve obtained by a temperature rising elution fractionation method with respect to the copolymer, a ratio (L/H) of a proportion (L: area %) of components with elution temperatures of from 190 to 200° C. to a proportion (H: area %) of components with elution temperatures of at least 205° C., and a proportion (M: mol %) of the structural units derived from the third monomer based on all structural units of the copolymer, satisfy a relation of the following formula (I):

$$\log(L/H)/M \geq 0.90 \tag{I}.$$

2. The copolymer according to claim 1, wherein a proportion of the structural units derived from tetrafluoroethylene based a total of the structural units derived from ethylene and the structural units derived from tetrafluoroethylene, is from 40 to 70 mol %.

3. The copolymer according to claim 1, wherein a proportion of the structural units derived from the third monomer based on all structural units of the copolymer is from 0.1 to 5 mol %.

4. The copolymer according to claim 1, wherein the third monomer is a fluoroalkyl ethylene or a perfluoro(alkyl vinyl ether).

5. The copolymer according to claim 1, which has a melting point of from 230 to 280° C.

6. The copolymer according to claim 1, which has a melt flow rate of 1 to 50 g/10 min as measured in accordance with ASTM D3159 under conditions of a temperature of 297° C. and a load of 49N.

7. A wire coating resin material, comprising the copolymer according to claim 1.

8. An electric wire, comprising
a core wire and
a coating layer made of the wire coating resin material according to claim 7 coated on the core wire.

9. The electric wire according to claim 8, wherein the coating layer has a thickness of from 0.01 to 5 mm.

10. The electric wire according to claim 8, wherein the core wire has a cross sectional area of from 0.01 to 200 mm$^2$.

11. A method for producing the copolymer according to claim 1, the method comprising initiating polymerization by charging ethylene, tetrafluoroethylene and the third monomer into a polymerization vessel, and subsequently supplying additional ethylene, tetrafluoroethylene and the third monomer continuously or intermittently into the polymerization vessel, wherein a proportion (m2: mol %) of the third monomer to be additionally supplied based on a total of ethylene and tetrafluoroethylene to be additionally supplied, is differentiated from a proportion (M1: mol %) of the structural units derived from the third monomer based on all structural units of the copolymer to be formed at the initial stage of polymerization so that m2/M1 is at least 1.10.

12. The method according to claim 11, wherein a compound having a chlorine-carbon bond is not permitted to substantially exist in the polymerization vessel.

13. The method according to claim 11, wherein a proportion of the structural units derived from tetrafluoroethylene based on a total of the structural units derived from ethylene and the structural units derived from tetrafluoroethylene in the obtained copolymer, is from 40 to 70 mol %.

14. The method according to claim 11, wherein a proportion of the structural units derived from the third monomer based on all structural units of the copolymer, is from 0.1 to 5 mol %.

15. The method according to claim 11, wherein the third monomer is a fluoroalkyl ethylene or a perfluoro(alkyl vinyl ether).

* * * * *